(12) United States Patent
Mougin et al.

(10) Patent No.: US 8,695,781 B2
(45) Date of Patent: Apr. 15, 2014

(54) MACHINE FOR FORMING GROUPS OF PRODUCTS FOR THE CASING THEREOF

(75) Inventors: Didier Mougin, Octeville-sur-Mer (FR);
Guillaume Duchemin,
Octeville-sur-Mer (FR); David Gatos,
Octeville-sur-Mer (FR); Thierry Garnier, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 0 days.

(21) Appl. No.: 13/519,978

(22) PCT Filed: Dec. 27, 2010

(86) PCT No.: PCT/FR2010/052921
§ 371 (c)(1),
(2), (4) Date: Jun. 29, 2012

(87) PCT Pub. No.: WO2011/080481
PCT Pub. Date: Jul. 7, 2011

(65) Prior Publication Data
US 2012/0273324 A1 Nov. 1, 2012

(30) Foreign Application Priority Data
Dec. 30, 2009 (FR) ...................................... 09 59663

(51) Int. Cl.
*B65G 25/00* (2006.01)
*B65G 47/26* (2006.01)

(52) U.S. Cl.
USPC ........... 198/431; 198/426; 198/429; 198/736; 198/749

(58) Field of Classification Search
USPC .......... 198/373, 416, 429, 431, 432, 736, 749
See application file for complete search history.

(56) References Cited

U.S. PATENT DOCUMENTS

| | | | | |
|---|---|---|---|---|
| 2,684,799 | A * | 7/1954 | Holstein | 53/496 |
| 3,244,266 | A * | 4/1966 | Zappia et al. | 198/430 |
| 5,429,651 | A * | 7/1995 | Bolin | 65/241 |
| 6,889,485 | B2 * | 5/2005 | Davaillon | 53/443 |
| 8,167,113 | B2 * | 5/2012 | Mougin et al. | 198/418.5 |
| 2010/0193326 | A1 | 8/2010 | Mougin et al. | |
| 2012/0118701 | A1 * | 5/2012 | Duchemin et al. | 198/429 |

FOREIGN PATENT DOCUMENTS

| | | |
|---|---|---|
| DE | 10 2004 015969 A1 | 10/2005 |
| EP | 1 052 200 A1 | 11/2000 |
| FR | 2 918 359 A1 | 1/2009 |
| GB | 1 183 475 A | 3/1970 |

OTHER PUBLICATIONS

International Search Report of PCT/FR2010/052921 dated Mar. 24, 2011.

* cited by examiner

*Primary Examiner* — Leslie A Nicholson, III
(74) *Attorney, Agent, or Firm* — Sughrue Mion, PLLC

(57) ABSTRACT

The invention relates to a machine for forming groups of products that arrive in a line, separated on a feeding conveyor (2), which includes vertically separated collectors (4) connected to chutes (8) that are arranged transversely relative to the feeding axis, said chutes (8) each comprising a mobile carriage (7) that supports a collector (4) by means of an actuator (11), said carriages (7) and actuators (11) being vertically adjacent and controlled by a programmable automaton (17) suitable for controlling the cyclic polygonal movement of each collector (4). The means for controlling the collectors (4) offer the possibility of organizing the capture of the products and, in particular, of selecting a number of collectors (4) suited to the group forming rates and/or the type of products (1) to be formed into groups.

14 Claims, 3 Drawing Sheets

MACHINE FOR FORMING GROUPS OF PRODUCTS FOR THE CASING THEREOF

CROSS REFERENCE TO RELATED APPLICATIONS

This application is a National Stage of International Application No. PCT/FR2010/052921 filed Dec. 27, 2010, claiming priority based on French Patent Application No. 09 59663 filed Dec. 30, 2009, the contents of all of which are incorporated herein by reference in their entirety.

The invention relates to a machine for forming groups of products to be boxed or cased, particularly products such as bottles or other products.

Grouping products such as bottles or other products, when they exit a machine such as a labeler for example, can be done in different ways depending on the shape and type of product and also on the desired production rates.

A first example of a grouping machine is described in document FR 2 918 359. In this document, the grouping machine includes a conveyor which feeds products in single file. The products are collected by a rake-shaped collection device arranged transversely to the longitudinal direction in which said products arrive.

The products are captured by the cells of this collector which moves in a cycle, first performing the product capture operation and then the operation of placing the batch of captured products on a table extending along the side of the feed conveyor, then returning to the starting point to capture the first product which arrives on said feed conveyor.

To perform the product capture operation, the collector moves in a combination of two movements: a movement transverse to the direction in which the products arrive, and a longitudinal movement parallel to this direction in which the products arrive.

The longitudinal component of the product capture operation occurs in a direction opposite that of the feed conveyor. This upstream longitudinal movement allows the collector to capture the products while they are moving, as it travels up the line of products arriving on the feed conveyor. The collector's progress upstream relative to the feed conveyor gains the time required to deposit the captured products and return to the starting point before again facing the first product arriving on the feed conveyor.

For the transfer operation, the movement of the collector is transverse only, then, after depositing the batch of captured products, the retreating movement is first longitudinal, at least for the time to release the batch, and then transverse to allow the collector to return to the starting point in front of the first product supplied by the feed conveyor.

For this return to the starting point, the longitudinal speed of the collector is sufficiently high to pass beyond the product at the head of the line on the feed conveyor and advancing at a continuous rate.

The machine described in this document also allows depositing the batch of captured products on one side of the feed conveyor or on both sides, which enables relatively high grouping rates.

Current trends in the flexibility and production rates of grouping machines of this type are imposing constraints that are increasingly difficult to accommodate.

Firstly, the combined movements of the collector as it conducts the product capture and grouping process are relatively complex: for the machine described in the French patent cited above, there is a relatively long dead time between two capture sequences that is difficult to modify, while the rate at which products are fed on the feed conveyor is much easier to manage and can benefit from a uniform speed that it is tempting to increase to improve the production rate.

To compensate for the dead time in the product capture, and maintain a sufficient production rate, the speeds and accelerations of the collector must be adjusted, particularly during the period it is empty. If these accelerations become too violent, they generate vibrations which can affect the stability of products on the machine and cause incidents.

Another type of grouping machine, as described in document EP 1 052 200, captures products arriving in a single line on a feed conveyor. The products are captured by a set of three rake-shaped collectors, which succeed one another at the capture station, in front of the arriving products.

These three collectors are arranged at the same level relative to the arrival of the products and are attached and driven by means of a system comprising two endless chains which are transversely offset, each one in a horizontal plane, these planes being vertically apart by a height which is greater than the height of said collectors. The collectors simultaneously travel a closed loop during which each collector captures the arriving products, then places them on a side belt which carries them away, before returning to the starting point by passing behind the other collectors which are also following the same circuit.

The three collectors are connected to each other to form a noria-like arrangement; their points of connection to the drive chains are fixed and the space between two adjacent collectors always remains, so that, in order to capture the arriving products, either the arrival of the products on the feed conveyor is stopped, or there is specific management of the speed and accelerations of the collectors.

The present invention proposes a machine for grouping products which permits, particularly at high production rates, the possibility of reducing the speed of the collectors' movements when they are empty and reducing the accelerations, which has the effect of limiting the vibrations of these collectors and of the machine in general.

The movements of each collector are also simplified. During the product capture phase, each collector follows a simple movement that is transverse to the axis of the products' arrival; there is no combined upstream longitudinal movement along the line of products as is the case in the French patent cited above, and, compared to the European patent cited above, the products can maintain a uniform speed between the moment when they are separated from the others and the moment where they are collected in the cells of a collector to form the batch. These different collectors, when they are in action, give an impression of a continuous capture; they form an "endless collector", which allows products to arrive at a uniform rate, with no halts in their advance.

The invention also proposes a machine which almost universally answers the current demand for flexibility, performance, and reliable operation. This machine can easily adapt to the different types of products to be grouped, as well as to the size of the product batches; it allows managing production rates, and managing the path of each collector to adapt to requirements. This optimizes the time required to form the product batches.

The invention proposes a machine which is rather universal in character because it effectively multiplies the modes of operation for capturing products and also offers the possibility of capturing products of varying shapes, particularly products that are not the most stable, due to their size and/or the position of their center of gravity for example.

This stability of the products on the machine can also be affected by several factors, such as movement speeds and accelerations, as well as factors which depend on the type of product and on disturbances due to friction on the feed conveyor and on the table where the batch of products is collected once grouped.

In addition, the machine of the invention has relatively modest space requirements; this feature facilitates its integration into a product preparation and packaging line such as, for example, a facility for casing products in all types of boxes, including a wrap-around box or a classic slotted box, also named American box.

The grouping machine of the invention relates to products arriving in a single line, and spaced apart, on a feed conveyor, said machine comprising rake-shaped collectors arranged transversely to the longitudinal axis of the products' arrival, said collectors following a cyclical polygonal movement: —to capture said products one after another, —then to move them onto a laterally positioned table on which the batch of products is collected for casing, and —then to return to the starting point; said collectors being vertically offset relative to each other and connected to runners arranged transversely, said runners each comprising a mobile carriage which supports a collector by means of an actuator, said carriages and actuators being superimposed and controlled by a logic controller to direct said cyclical polygonal movement of each collector.

Still according to the invention, the grouping machine comprises a means for controlling the position of the products on the feed conveyor, said means consisting of a sensor connected to the logic controller in order to coordinate the movements of the carriages and their collectors with the position of said products, at the capture station.

In another arrangement of the invention, each collector is movable in a horizontal mid-plane which passes through the axis of its actuator.

Still according to the invention, the logic controller directing the collectors comprises a programming interface offering the possibility of selecting a number of collector(s) adapted to the different grouping modes and/or types of products to be grouped.

In another arrangement of the invention, the programming interface offers the possibility of selecting at least one, two, three, or four collectors, or pairs of collectors, or of selecting a collector and a pair of collectors.

Still according to the invention, each collector consists of one or more rakes which are spaced apart and superimposed, in a manner that multiplies the contacts with the products in order to improve their stability during their transfer between the feed conveyor and the depositing station at the collection table.

In another arrangement of the invention, the collector comprises cells of a depth that can accept one or more products in order to group them into a batch.

Still according to the invention, in the case of products to be grouped which have a non-circular cross-section, such as an ovoid bottle, each collector comprises cells arranged obliquely to the longitudinal axis of the feed conveyor, the axis of said cells forming a non-zero angle a with the longitudinal axis of the feed conveyor, said angle being between 10 and 45° for example.

In another arrangement of the invention, in the case of collectors with cells in the oblique arrangement, the actuators are also arranged obliquely, parallel to the axis of said cells to allow releasing the batch of products without jostling them.

Still according to the invention, the grouping machine comprises at least one product handling robot, said robot having a grasping head able to collect at least one batch of products at the depositing station so they can be cased, said robot also allowing grouping each batch deposited by the collector in order to form a total batch consisting of a number of products likely to fill a box completely.

In another arrangement of the invention, the grouping machine includes a collection table which comprises a fixed plane on which the products captured by each collector are placed as they are moved by said collector. This fixed plane comprises an arrangement at the depositing station, such as dimples or bumps for example, for retaining the batch of captured products as said collector withdraws, meaning at the time said products are released at the depositing station.

Still according to the invention, for the case of a batch of products to be cased in a wrap-around blank, the grouping machine comprises a push tool associated with a robot or other means, to enable a simple transverse transfer of said batch of products to a casing conveyor on which said blank is installed and which is arranged along the edge of the depositing station.

The invention is explained in a sufficiently clear and complete manner in the following description to enable its use. This description is accompanied by the attached drawings, in which.

Figure 6:
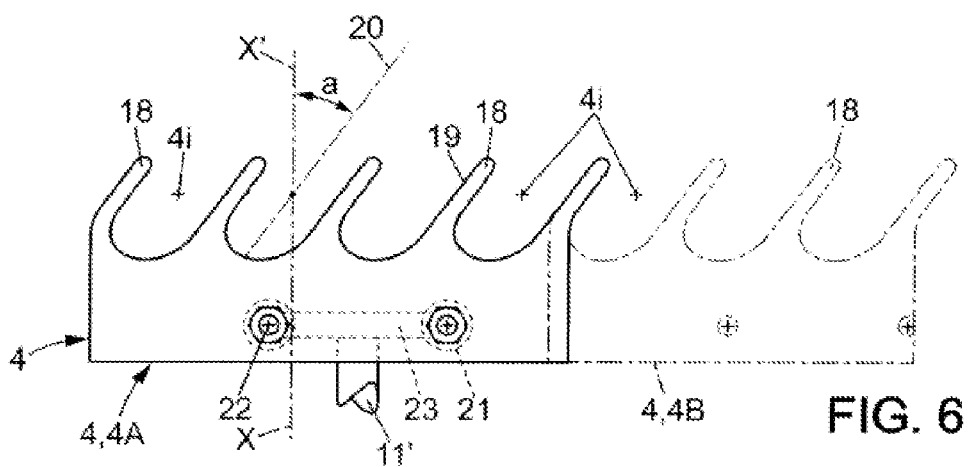
Figure 7:
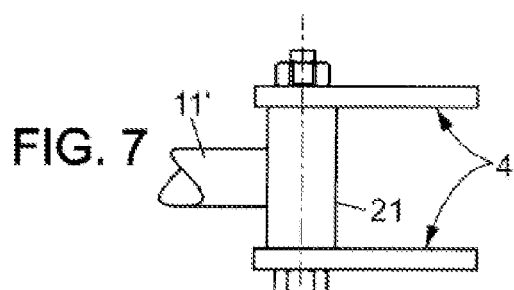
Figure 8:
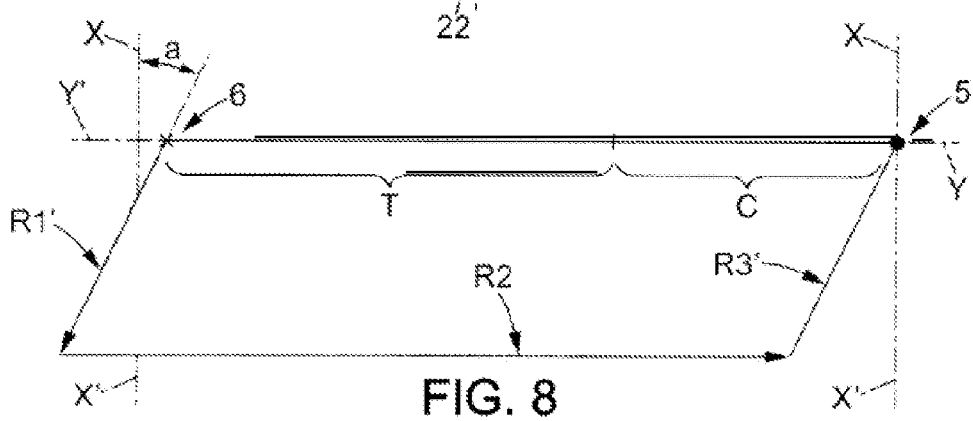

FIG. 6 uses a solid line to represent a collector for grouping products having a non-circular cross section, meaning products such as ovoid bottles for example, said grouping occurring in an angled row configuration; it uses a dashed line to represent an adjacent collector, to illustrate that the centerline distance between the cells of two adjacent collectors is identical to that between the cells of the collector itself;

FIG. 7 is a side view of a collector consisting of two superimposed rakes;

FIG. 8 represents the path of a collector when products are to be captured with a collector having cells arranged obliquely in order to group products in an angled row distribution.

Figure 1:
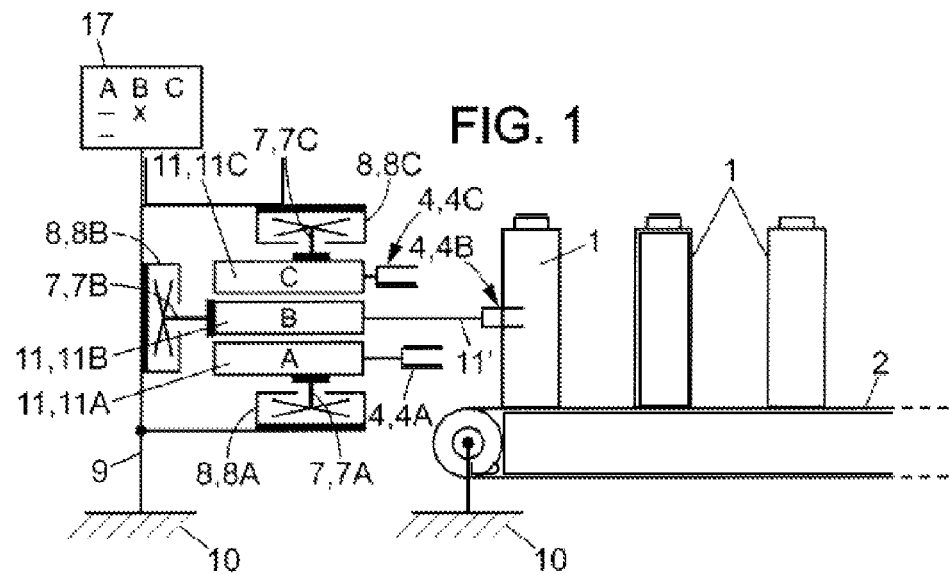
FIG. 1 is a schematic elevation view of a first embodiment of the machine of the invention, comprising three superimposed collectors.
Figure 2:
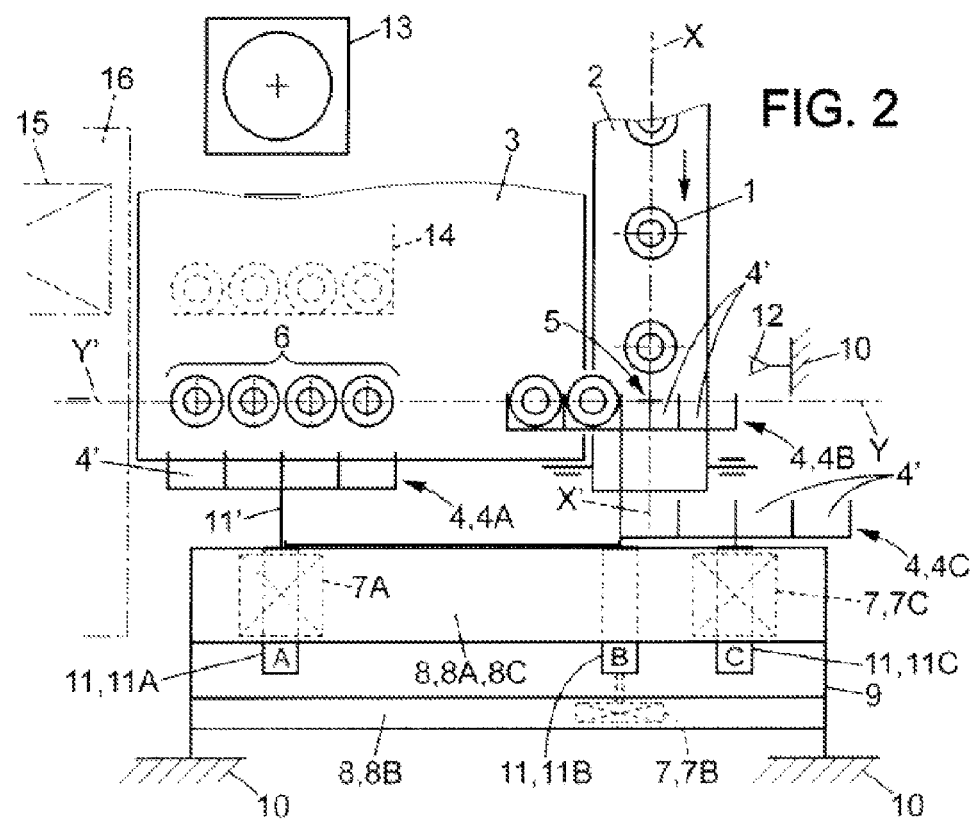
FIG. 2 is a schematic top view of the machine represented in FIG. 1.

FIGS. 1 and 2 show products 1 arranged on a feed conveyor 2. These products 1 arrive in single file along a longitudinal axis xx', and are preferably spaced apart at regular intervals by appropriate means situated upstream, not represented. These products 1 are arriving one at a time, but, depending on the type of product, they could also arrive already grouped into batches and in some cases even prepackaged in thermoplastic shrink wrap.

The feed conveyor 2 for the products is associated with a side table 3. This table 3 is situated in the same horizontal plane as the plane of the feed conveyor 2 supplying the products 1, in order to receive said products 1 before they are cased.

This table 3 is in the form of a simple fixed plane onto which the products 1 can slide; it could just as well consist of a belt which carries the products 1 according to requirements.

The products 1 are captured on the feed conveyor 2, at its downstream end for example, by a set of collectors 4 which have the distinctive feature of being situated at different levels; the different collectors 4 are vertically offset relative to each other. These different collectors 4, indicated by the letters A, B and C in FIGS. 1 and 2, collect the products 1 on the feed conveyor 2, one after another. These products 1 are captured on the feed conveyor 2 at a capture station 5 which is indicated by a cross.

Each collector 4 is in the form of a rectilinear rake, having teeth which delimit multiple cells 4' and which are parallel to the longitudinal axis xx'. The shapes and dimensions of said cells 4' are related to the products 1 to be captured. The collectors 4 installed on the machine form a noria type of arrangement, meaning that said collectors 4 arrive one after another at the capture station 5 at the end of the product 1 feed conveyor 2 in order to capture these products as they arrive.

To perform the product 1 capture operation, the collectors 4 present themselves to the station 5 one after another, forming what could be called an endless collector, as detailed below in relation to FIG. 6. This capture operation occurs at a speed which is in relation to the speed of the feed conveyor 2.

Outside of the capture operation where they are positioned one behind another and vertically offset, with no horizontal gap between them, each collector 4 moves alone to release its batch of product 1 at a depositing station 6 and then to return to the starting point and reposition itself following the previous collector 4 which is at the end of the active product 1 collection position, at the capture station 5, where the product or products are supplied by the feed conveyor 2.

Each collector 4 is supported by a carriage 7 which is transversely movable relative to the feed conveyor 2 for the products 1, meaning movable perpendicular to the longitudinal axis xx'.

Each carriage 7 is guided by means of a system of runners 8, for example runners 8 that are superimposed, parallel to each other, and arranged transversely. These runners 8 are supported by a structure 9 which is integrally attached to the general frame 10 of the machine, and are parallel to each other.

The different carriages 7, denoted with the letters A, B and C in FIGS. 1 and 2, are therefore arranged, similarly to the collectors 4, at different levels relative to the product 1 capture station 5, at the end of the feed conveyor 2. The carriages 7 are transversely movable by appropriate actuating elements, not represented, such as a servomotor with gearbox and cogged belt for example.

Each carriage 7 supports a collector 4 through an actuating device, consisting for example of a hydraulic cylinder 11 or multiple hydraulic cylinders depending on the requirements; the rod of said hydraulic cylinder 11 acts as an arm 11' to support the collector 4 with which it is associated.

In the embodiment of FIG. 2, these actuators 11 are arranged parallel to the longitudinal axis xx' in order to move the collectors 4 between a product 1 capture position and a withdrawn position which allows them to return to the start point, meaning the capture station 5, after releasing said products 1 at the depositing station 6 which is located on the collection table 3.

In FIG. 1 and FIG. 2, the actuators 11 are also indicated using the letters A, B and C, as are the corresponding collectors 4, carriages 7, and runners 8.

Still in FIGS. 1 and 2, the collector 4B is in an active position for capturing products 1, while the collector 4A is in an intermediate position, in the process of withdrawing after depositing its batch of products 1 on the collection table 3, at the depositing station 6. The collector 4C is in the inactive position, waiting to take over for the collector 4B when the latter is filled with its batch of products 1.

These three collectors 4 therefore form a noria-like arrangement which collects products 1 at the capture station 5 and then carries this batch of products 1 to the depositing station 6.

The movement of the collectors 4 between the two stations 5 and 6 occurs along a path which is rectilinear and which corresponds to the transverse axis yy', said axis yy' being perpendicular to the longitudinal axis xx'.

Preferably, the capture of the products 1 is controlled by a sensor 12, visible in FIG. 2, which detects the passage of a product 1 and, by means of a programmable logic controller which will be further discussed below, provides knowledge of the distance of said product 1 relative to the collector 4 assigned to capture this product 1 which is arriving on the feed conveyor 2, as a function of the speed of said conveyer 2. This sensor 12 is positioned laterally to the conveyor 2, on the side opposite the collection table 3, and is upstream from the position of the collectors 4 when they are in the capture position.

The collectors 4 preferably consist of rakes which are removably attached to the arms 11' of the actuators 11 for easy change-out, to allow matching the shape of the rake cells to the cross-section of the products 1 to be grouped.

Each collector 4 rake may, for example, be in the form of a plate of thermoplastic material with cells having a shape corresponding as closely as possible to that of the products to be captured.

These cells, FIG. 2, are centered on an axis which is parallel to the longitudinal axis xx' of the feed conveyor 2 for the products, and their longitudinal dimension, or depth, may also vary depending on whether one or two products 1 or more are to be captured, particularly in the longitudinal direction. The products captured may also be in the form of a batch of products 1 already grouped into rows and possibly prepackaged in plastic film.

At the depositing station 6, the batch of products 1 is taken over by an appropriate means, such as a robot 13 for example as diagrammed in FIG. 2, which comprises a manipulation head 14 that may be in the form of a simple push tool that moves the batch of products 1 into a wrap-around box 15 arranged on a casing conveyor 16, said conveyor 16 extending along the side of the collection table 3.

The robot 13 may also act via a manipulation head 14 appropriate for grouping, on the collection table 3, several batches of products 1 captured by the different collectors 4 in order to form a total batch in which the number of products corresponds to the number of products likely to fill the box 15 arranged on the casing conveyor 16.

This grouping machine, diagrammed in FIG. 1 and FIG. 2, also has the advantage of being able to operate in different ways, as detailed below for one embodiment. In degraded mode for example, it can operate with a single collector 4; it can operate with only two collectors or with three collectors, and it can also function with a pair of grouped collectors 4A and 4C, said pair being associated with the single collector 4B. This particular composition of the different collectors 4 (one collector plus a pair of collectors) can, for certain products 1, improve their stability during handling by grasping said products 1 within a preferred area along the height of said products 1.

The machine may comprise a logic controller 17 equipped with a programming interface which allows selecting the product capture mode, meaning one can select all the collectors 4, one or two collectors 4, or even an assortment of collectors 4.

Figure 3:
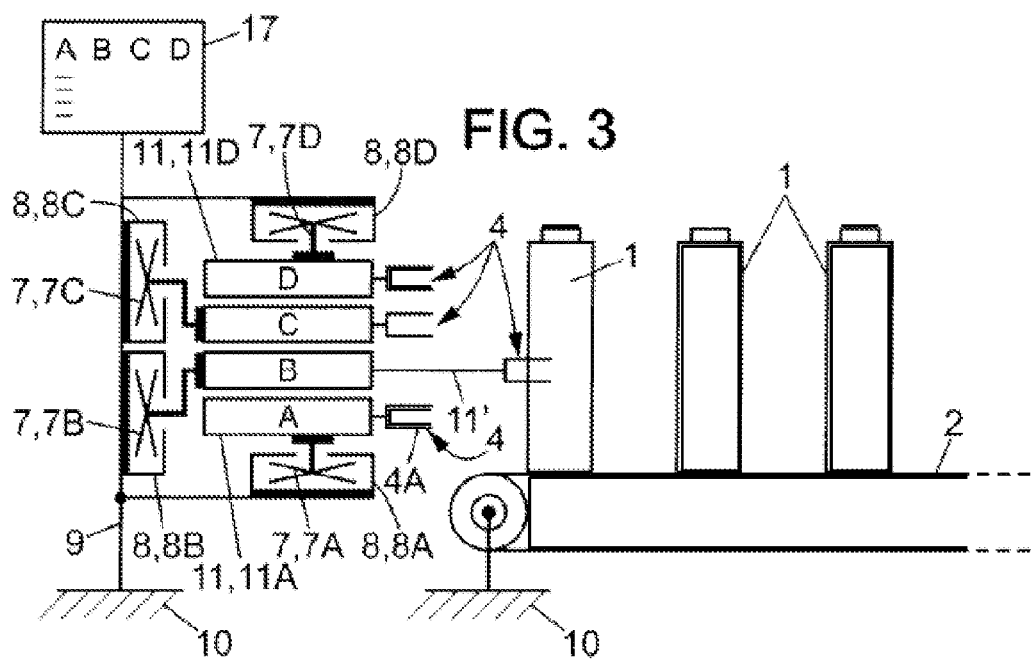
FIG. 3 is a schematic elevation view of a machine according to a second embodiment, in which the machine has four superimposed collectors.
Figure 4:
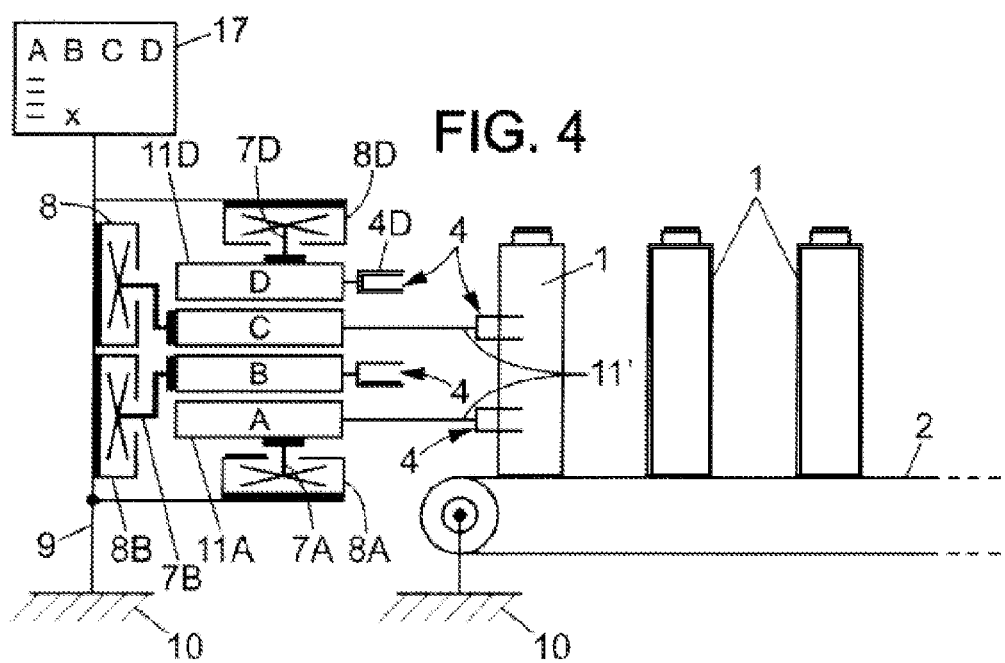
FIG. 4 shows the machine of the second embodiment in a configuration in which the collectors are associated in pairs, in order to group products of poor stability for example.

FIGS. 3 and 4 schematically represent a grouping machine which comprises four collectors 4 that are vertically offset relative to each other. These different collectors 4, denoted with the letters A, B, C and D, are respectively carried by carriages 7 as described above, also denoted with the letters A to D, by means of actuators 11 denoted A to D.

The carriages 7 are guided by and move on runners 8 denoted with the letters A to D, said runners 8 being superimposed, parallel to each other, and arranged transversely to the longitudinal axis xx'. Each of the runners 8 is supported, as described above, by a structure 9 integrally attached to the general frame 10 of the machine.

Here again, a programmable logic controller 17, having an appropriate interface, allows selecting the collectors 4 to be used to capture the products 1, as a function of the size of these products 1 for example, and also as a function of the rates at which these products arrive.

As described above, the different product 1 capture modes can comprise multiple modes of using the different collectors 4. The machine can, of course, operate in degraded mode with a single collector 4. Its normal operation makes use of at least two collectors 4 which form a noria, meaning that the collectors 4 intervene one after the other at the capture station 5, with a constant pitch between two consecutive cells of the collectors 4 which follow one another, giving the impression of an endless collection system. The captured products 1 are then brought to the collection table 3, at the depositing station 6, where they form a batch which is then retrieved by the head 14 of the robot 13.

Another capture mode, as represented in FIGS. 3 and 4, may consist for example of using the collectors 4 by grouping them in pairs. This simultaneous operation of pairs of collectors 4 also allows capturing products 1 that are large in size and are therefore fairly unstable by their very nature. Under these conditions, the machine operates as if it has only two collectors 4, without this mode of operation necessarily being considered as a degraded mode.

Figure 5:
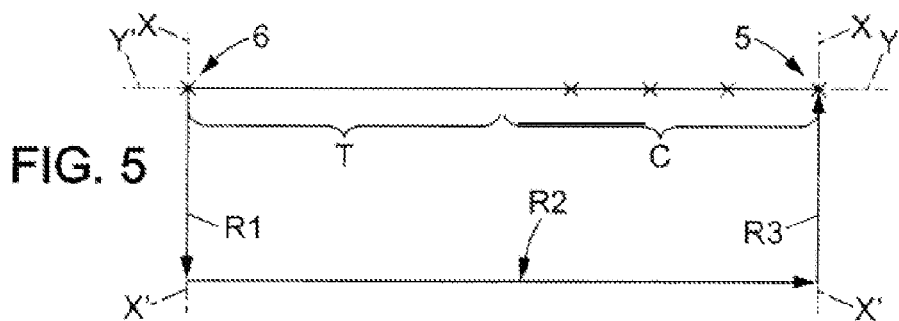
FIG. 5 represents the path of a collector when grouping ordinary products.

FIG. 5 illustrates the movement of one of the collectors 4, in a closed cycle. All the collectors 4 follow the same looped movement, which corresponds to a "square" cycle although it is more rectangular.

The movement of the collector 4 begins with the capture of the first product 1, at the station 5, and this movement continues stepwise for the time required to fill all the cells 4' of said collector. As soon as the collector 4 is filled with products 1, another collector 4 takes over, and during this time, the filled collector 4 transfers its batch of captured products 1 at the depositing station 6.

This entire capture phase at station 5, denoted C, and the transfer phase at station 6, denoted T, occur in a transverse movement perpendicular to the longitudinal axis xx'.

Then, after the products are released at station 6, the collector 4 is moved in a motion which comprises: —a first portion denoted R1, said portion R1 being, for example, parallel to the longitudinal axis xx' of the feed conveyor 2 in order to execute a retreating movement which at the same time releases the batch of products 1 at the depositing station 6, then —a second portion R2, executing a transverse movement, and lastly, —a third portion R3 in order to execute an advancing movement which returns the collector 4 to the starting point, meaning the product 1 capture station 5. During this return to the starting point, the collectors 4 pass each other in the portion R2.

In this embodiment illustrated in FIGS. 1 to 5, each actuator 11 is oriented to be parallel to the longitudinal axis xx', meaning parallel to the axis of the arrival of the products 1.

FIG. 6 represents a rake-shaped collector 4 which is arranged to accept products having a non-circular cross-section, particularly ovoid bottles for example.

These ovoid products 1 are grouped to form a batch which is in a specific configuration called an "angled row".

The collector 4, represented in FIG. 6, comprises cells 4i arranged obliquely relative to the longitudinal axis xx'. This arrangement allows directly orienting the products 1 in a direction which will allow directly delivering the batch in this angled row configuration.

The orientation of the products 1 occurs automatically during their introduction into the cell 4i allocated to them. In fact, each product 1 enters the cell 4i at a certain speed, in particular a speed corresponding to the speed of the feed conveyor 2, and this speed is sufficient to pivot the product 1 in contact with the tooth 18 and, in particular, the wall 19 which delimits a side of the cell 4i.

The angle a, which corresponds, as represented in FIG. 6, to the angle of inclination of the axis 20 of the cells 4i relative to the longitudinal axis xx', is between 10 and 45° for example.

FIG. 7 shows a side view of a collector 4 consisting of two rakes spaced apart by a pair of braces and assembled by screws 22. The presence of two superimposed rakes improves the stability of the products captured by this type of collector 4. These two rakes are integrally attached to the arm 11' by means of braces 21 and, for example, a brace 23 extending between said braces 21.

FIG. 8 illustrates the closed path followed by collectors 4 having oblique cells 4i for accepting products 1 to be grouped in angled rows.

These collectors 4 operate in the same manner, in a closed polygonal cycle, but having a distinctive feature related to the movement of these collectors 4 during the release of the products 1 at the depositing station 6.

The collector 4 releases the products 1 at the depositing station 6, on the collection table 3, by executing a retreating movement in a direction which is oblique to the axis xx'.

The movement of each collector 4 begins with collecting, at the capture station 5, products 1 which are arriving on the feed conveyor 2. This is accompanied by a transverse stepwise movement which is denoted C in this FIG. 8.

The capture movement C and the following transfer movement, denoted T, occur as a transverse movement perpendicular to the longitudinal axis xx'. The transfer movement ends at the depositing station 6 where the batch of products 1 is released by the corresponding collector 4.

The collector 4 then executes a withdrawing movement in a direction having the same orientation as the cells 4i, to avoid displacing or jostling the products 1 positioned in said cells 4i.

Thus, as represented in FIG. 8, the withdrawing movement of the collector 4 extends over a rectilinear segment R1' which is parallel to the axis 20 of the cells 4i.

This withdrawing movement of the collector 4, after releasing the batch at the depositing station 6, implies having an actuator 11 oriented the same as the axis 20 of the cells 4i, to enable executing a rectilinear movement as indicated by the segment R1'. The actuator 11 of each collector 4 therefore forms an angle of between 10 and 45°, approximately, with the longitudinal axis xx'.

After the withdrawing movement, the collector 4 moves along a transverse segment R2, and the next movement occurs along a segment R3' which may also be parallel to the axis 20 of the cells 4i. This last movement returns the collector 4 to the starting point, meaning the capture station 5, following the previous collector 4 which is ending its capture phase.

FIG. 6 shows the collectors 4 arranged to operate as a sort of endless collector at the capture station 5. The superposition at the capture station 5 of the end teeth 18 of two adjacent collectors 4 allows continuously maintaining the same interval between two consecutive cells of different collectors, whether they are the cells 4i of the collectors 4 represented in FIG. 6 or the cells 4' of the collectors 4 represented in FIG. 2.

The invention claimed is:

1. A machine for grouping products arriving in a single line and spaced apart on a feed conveyor, said machine comprising at least two rake-shaped collectors arranged transversely to a longitudinal axis of said feed conveyor and the arrival of the products, said collectors following a cyclical polygonal movement: to capture said products one after another, then to move said collectors onto a laterally positioned collection table on which a batch of products is collected for casing, and then to return to a starting point;

wherein said collectors are vertically offset relative to each other and are connected to respective runners arranged transversely to said longitudinal axis, each of said runners comprising a respective mobile carriage which supports a respective collector by a respective actuator, said carriages and actuators being superimposed and controlled by a logic controller to direct said cyclical polygonal movement of each collector.

2. The grouping machine according to claim 1, comprising a means for controlling the position of the products on said feed conveyor.

3. The grouping machine according to claim 1, wherein each collector is movable in a horizontal mid-plane which passes through an axis of said respective actuator.

4. The grouping machine according to claim 1, wherein said logic controller directing said collectors comprises a programming interface offering the possibility of selecting a number of collector(s) adapted to at least one of different grouping modes and types of products to be grouped.

5. The grouping machine according to claim 4, wherein said programming interface offers the possibility of selecting at least one, two, three, or four collectors, or pairs of collectors, or of selecting a collector and a pair of collectors.

6. The grouping machine according to claim 1, wherein each collector comprises at least two rakes which are spaced apart and superimposed, in a manner that multiplies the contacts with the products in order to improve the stability of the products during the transfer thereof between said feed conveyor and a depositing station at said collection table.

7. The grouping machine according to claim 1, wherein each collector comprises cells of a depth that can accept one or more products in order to group them into a batch.

8. The grouping machine according to claim 1, wherein, for grouping products having a non-circular cross-section, each collector comprises cells arranged obliquely to said longitudinal axis of said feed conveyor, each of said cells having a cell axis forming a non-zero angle with said longitudinal axis of said feed conveyor.

9. The grouping machine according to claim 8, wherein, in the case of collectors with cells in the oblique arrangement, said actuators are arranged obliquely, parallel to said cell axis to allow releasing a batch of products without jostling said products.

10. The grouping machine according to claim 1, comprising at least one robot for handling the products, said robot having a grasping head able to collect at least one batch of products at a depositing station at said collection table so the products can be cased, said robot also allowing grouping each batch deposited by a collector in order to form a total batch comprising a number of products likely to fill a box directly.

11. The grouping machine according to claim 1, wherein said collection table comprises a fixed plane on which the products captured by each collector are placed as the products are moved by said collector, said fixed plane comprising a depositing station for retaining a captured batch of products as said collector withdraws, at the time said products are released at said depositing station.

12. The grouping machine according to claim 1, wherein, for the case of a batch of products to be cased in a wrap-around blank, the machine comprises a push tool associated with a robot, to enable a simple transverse transfer of said batch of products to a casing conveyor on which said blank is installed and which is arranged along an edge of a depositing station at said collection table.

13. The grouping machine according to claim 2, wherein said means for controlling the position of the products on said feed conveyor comprises a sensor connected to said logic controller in order to coordinate the movements of said carriages and said collectors with the position of said products, at a capture station.

14. The grouping machine according to claim 1, comprising a sensor connected to said logic controller in order to coordinate the movements of said carriages and said collectors with the position of said products, at a capture station.

* * * * *